(12) United States Patent
Sharma et al.

(10) Patent No.: US 10,972,487 B2
(45) Date of Patent: Apr. 6, 2021

(54) CONTENT DELIVERY NETWORK PROTECTION FROM MALWARE AND DATA LEAKAGE

(71) Applicant: Zscaler, Inc., San Jose, CA (US)

(72) Inventors: Dhawal Kumar Sharma, San Jose, CA (US); Manoj Apte, San Jose, CA (US); Patrick Foxhoven, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 16/258,807

(22) Filed: Jan. 28, 2019

(65) Prior Publication Data

US 2019/0158516 A1 May 23, 2019

Related U.S. Application Data

(63) Continuation of application No. 15/010,441, filed on Jan. 29, 2016, now Pat. No. 10,237,286.

(51) Int. Cl.
| | | |
|---|---|---|
| *H04L 9/00* | (2006.01) | |
| *H04L 29/06* | (2006.01) | |
| *H04L 29/08* | (2006.01) | |

(52) U.S. Cl.
CPC ...... *H04L 63/1416* (2013.01); *H04L 63/1425* (2013.01); *H04L 63/1458* (2013.01); *H04L 67/10* (2013.01)

(58) Field of Classification Search
CPC .................................................. H04L 63/1416
USPC .......................................................... 726/23
See application file for complete search history.

(56) References Cited

U.S. PATENT DOCUMENTS

| | | | |
|---|---|---|---|
| 7,894,350 B2 | 2/2011 | Kailash et al. | |
| 7,899,849 B2 | 3/2011 | Chaudhry et al. | |
| 8,010,085 B2 | 8/2011 | Apte et al. | |
| 8,130,768 B1 * | 3/2012 | Ahrens ................... | H04L 45/00 370/352 |
| 8,276,202 B1 | 9/2012 | Dubrovsky et al. | |
| 8,365,259 B2 | 1/2013 | Chaudhry et al. | |
| 8,438,630 B1 | 5/2013 | Clifford | |
| 8,458,769 B2 | 6/2013 | Dilley et al. | |
| 8,656,154 B1 | 2/2014 | Kailash et al. | |
| 8,713,674 B1 | 4/2014 | Geide | |
| 8,806,593 B1 | 8/2014 | Raphel et al. | |
| 8,869,259 B1 | 10/2014 | Udupa et al. | |
| 8,949,978 B1 | 2/2015 | Lin et al. | |
| 9,152,789 B2 | 10/2015 | Natarajan et al. | |

(Continued)

*Primary Examiner* — Christopher J Brown
(74) *Attorney, Agent, or Firm* — Clements Bernard Walker; Lawrence A. Baratta, Jr.; Jacob P. Beers

(57) ABSTRACT

A Content Delivery Network (CDN) includes one or more cache servers communicatively coupled to end users for providing content thereto; and one or more origin servers communicatively coupled to the one or more cache servers through a plurality of nodes, the one or more cache servers are configured to receive traffic related to the content from the one or more origin servers through the one or more nodes of the plurality of nodes, based on one or more of a push technique and a pull technique, and the plurality of nodes are configured to monitor the traffic between the one or more origin servers and the one or more cache servers in an inline manner, process the traffic for malware and data leakage based on policy, and block the traffic responsive to detection of one or more of the malware and the data leakage, prior to traffic entering the CDN.

20 Claims, 9 Drawing Sheets

(56) References Cited

U.S. PATENT DOCUMENTS

| | | |
|---|---|---|
| 10,171,540 B2 * | 1/2019 | Soffer .................. H04L 63/0227 |
| 2002/0073337 A1 | 6/2002 | Ioele et al. |
| 2004/0010601 A1 | 1/2004 | Afergan et al. |
| 2006/0074618 A1 | 4/2006 | Miller et al. |
| 2006/0259967 A1 | 11/2006 | Thomas et al. |
| 2007/0042756 A1 | 2/2007 | Perfetto et al. |
| 2008/0307519 A1 | 12/2008 | Curcio et al. |
| 2009/0129271 A1 | 5/2009 | Ramankutty et al. |
| 2011/0225647 A1 * | 9/2011 | Dilley ................. H04L 63/0218 726/14 |
| 2011/0246608 A1 * | 10/2011 | Wu ..................... H04L 65/4084 709/217 |
| 2012/0023325 A1 | 1/2012 | Lai |
| 2012/0278886 A1 * | 11/2012 | Luna ..................... G06F 21/552 726/22 |
| 2012/0281708 A1 | 11/2012 | Chauhan et al. |
| 2012/0304244 A1 * | 11/2012 | Xie ........................ G06F 21/00 726/1 |
| 2013/0191645 A1 | 7/2013 | Richardson et al. |

\* cited by examiner

CONTENT DELIVERY NETWORK PROTECTION FROM MALWARE AND DATA LEAKAGE

CROSS-REFERENCE TO RELATED APPLICATION(S)

The present disclosure is a continuation of U.S. patent application Ser. No. 15/010,441, filed Jan. 29, 2016, and entitled "CONTENT DELIVERY NETWORK PROTECTION FROM MALWARE AND DATA LEAKAGE," the contents of which are incorporated by reference herein.

FIELD OF THE DISCLOSURE

The present disclosure generally relates to computer networking systems and methods. More particularly, the present disclosure relates to protecting Content Delivery Networks (CDNs) from malware threats and data leakage through a highly available and redundant distributed security system.

BACKGROUND OF THE DISCLOSURE

A content delivery network or content distribution network (CDN) is a globally distributed network of proxy servers deployed in multiple data centers. The goal of a CDN is to serve content to end-users with high availability and high performance. CDNs serve a large fraction of the Internet content today, including web objects (text, graphics, and scripts), downloadable objects (media files, software, documents), applications (e-commerce, portals), live streaming media, on-demand streaming media, and social networks. CDNs distribute content for websites and content portals by caching updated content on a network of locally available servers in various geographies. This architecture enables CDNs to enable fast, personalized and local access to content for users of the websites and content portals. 'Content' servers in a CDN fetch content from a customer's 'Origin' servers and distribute it globally to the CDN edge servers across the globe within milliseconds over a dedicated high-speed network. These CDN edge servers are then accessed by end users through client applications. While CDN servers provide fast access and localized content to end users, it is also vulnerable to malware and security threats due to a compromised origin server. A compromised CDN node can potentially infect other servers and nodes in the network, which can infect millions of users worldwide.

CDNs are susceptible to following attack vectors: (1) compromised origin servers can push malware to CDN content servers. While common viruses and malware may be detected using legacy signature-based threat detection engines, nowadays sophisticated attacks can only be detected and blocked by an inline advanced threat protection and sandboxing technologies capable of detecting and blocking threats based on behavior. This would result in users going to a legitimate, high-reputation websites to be infected with malicious content. (2) Origin servers may leak proprietary and confidential content to CDN by oversight. (3) Origin servers may become a target for Denial of Service (DOS) attack. This stops the CDN from being able to fetch the updated content causing the website not to be updated and serving stale content. (4) Compromised origin servers would be blacklisted by service providers and would lead to a bad reputation for CDN, causing adverse impact to CDN's reputation and business.

When CDN networks poll their customer's Origin servers, it is not possible for them today to scan content for malware or data leakage due to high traffic volume, which has led to many security incidents in the recent past. As more and more content portals rely on CDNs for content delivery, eventually end users are exposed to potential malware threats from a compromised origin server. Also, there may be circumstances that due to human error or misconfiguration, a customer's IP (Intellectual Property) may be leaked through the CDN. This could be lead to legal liability as well as security exposure for the CDN network. An example is the recent phone hacking scandal and subsequent distributed of the photos.

Thus, there is a need for protecting CDNs from malware and data leakage.

BRIEF SUMMARY OF THE DISCLOSURE

In an exemplary embodiment, a Content Delivery Network (CDN) protection method, performed by a cloud node in a distributed security system, includes receiving traffic between one or more origin servers and the CDN; monitoring the traffic based on policy; detecting one or more of malware and data leakage in the traffic based on the policy; and blocking the traffic responsive to the detecting the one or more of the malware and the data leakage in the traffic, prior to the traffic entering the CDN.

In another exemplary embodiment, a node in a cloud-based security system configured to protect a Content Delivery Network (CDN) includes a network interface, a data store, and a processor communicatively coupled to one another; and memory storing computer executable instructions, and in response to execution by the processor, the computer-executable instructions cause the processor to receive traffic between one or more origin servers and the CDN; monitor the traffic based on policy; detect one or more of malware and data leakage in the traffic based on the policy; and block the traffic responsive to the detecting the one or more of the malware and the data leakage in the traffic, prior to the traffic entering the CDN.

In a further exemplary embodiment, a Content Delivery Network (CDN) includes one or more edge servers communicatively coupled to end users; and one or more cache servers communicatively coupled to one or more origin servers through a distributed security system, wherein the one or more cache servers are configured to receive traffic from the one or more origin servers through the distributed security system, based on one or more of a push technique and a pull technique, and, subsequent to processing by the distributed security system, receive the traffic, wherein the distributed security system is configured to monitor all of the traffic, detect one or more of malware and data leakage in the traffic based on the policy, and block the traffic responsive to the detecting the one or more of the malware and the data leakage in the traffic, prior to the traffic entering the CDN.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, CDN protection systems and methods are described. In particular, a distributed security system (a.k.a., a cloud-based security system) is overlaid and incorporated in the CDN network and associated connectivity to the Internet and origin servers. The distributed security system can include high-performance web proxies that inspect every web object transferred through it for malware and data leakage with a variety of techniques. In various exemplary embodiments, the distributed security system can be used to ensure malware is not propagated to the CDN as well as prevent data leakage therefrom. The distributed security system can provide various advantages including, for example, 1) anti-virus and anti-spyware controls, 2) file type detection and access controls, 3) sandboxing to detect and block behavior based threats, 4) data leakage prevention to detect and block any trade secret or confidential data leakage, 5) secure connectivity between 'Content' servers and 'Origin' servers, and the like. Access to origin servers from the CDN can be restricted through distributed security system service-only or via PBR (Policy Based Route).

§ 1.0 Example High-Level System Architecture—Cloud-Based Security System

Figure 1:
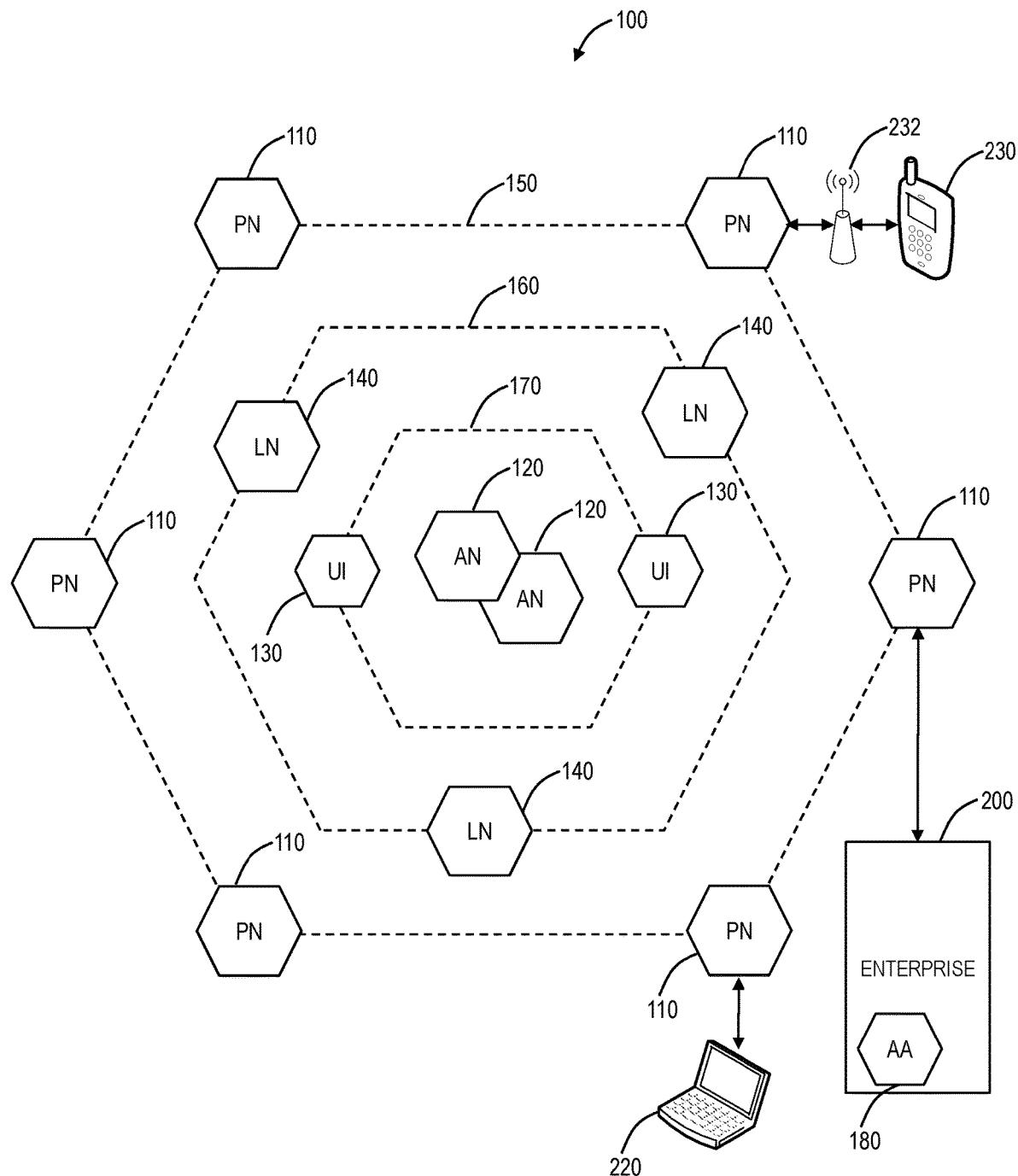
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
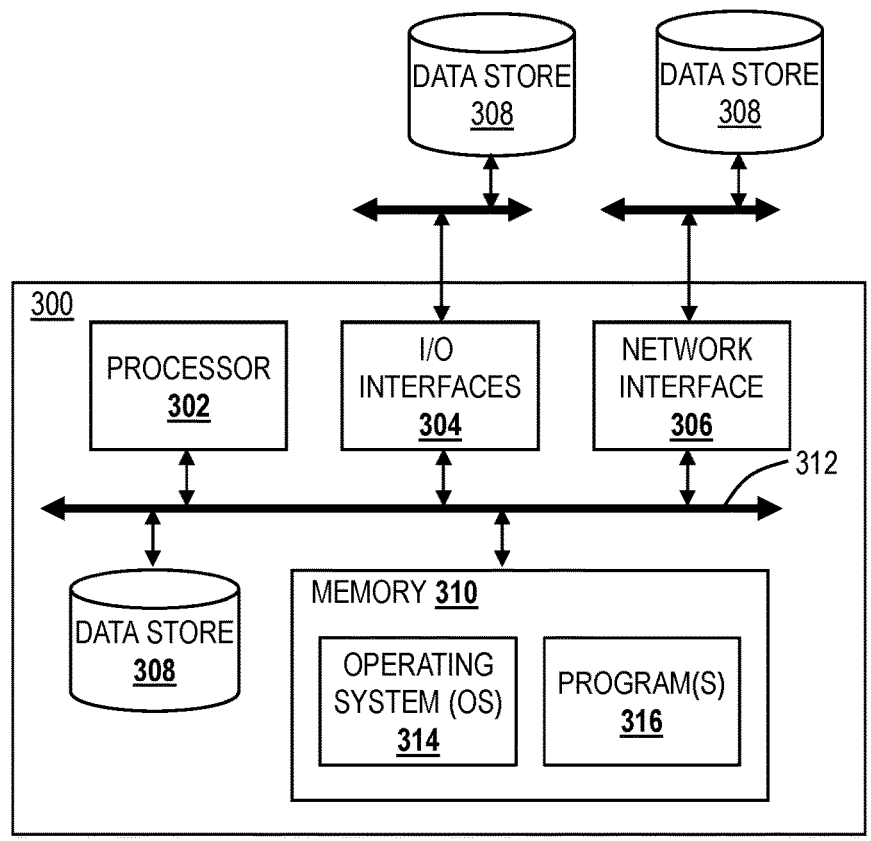
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
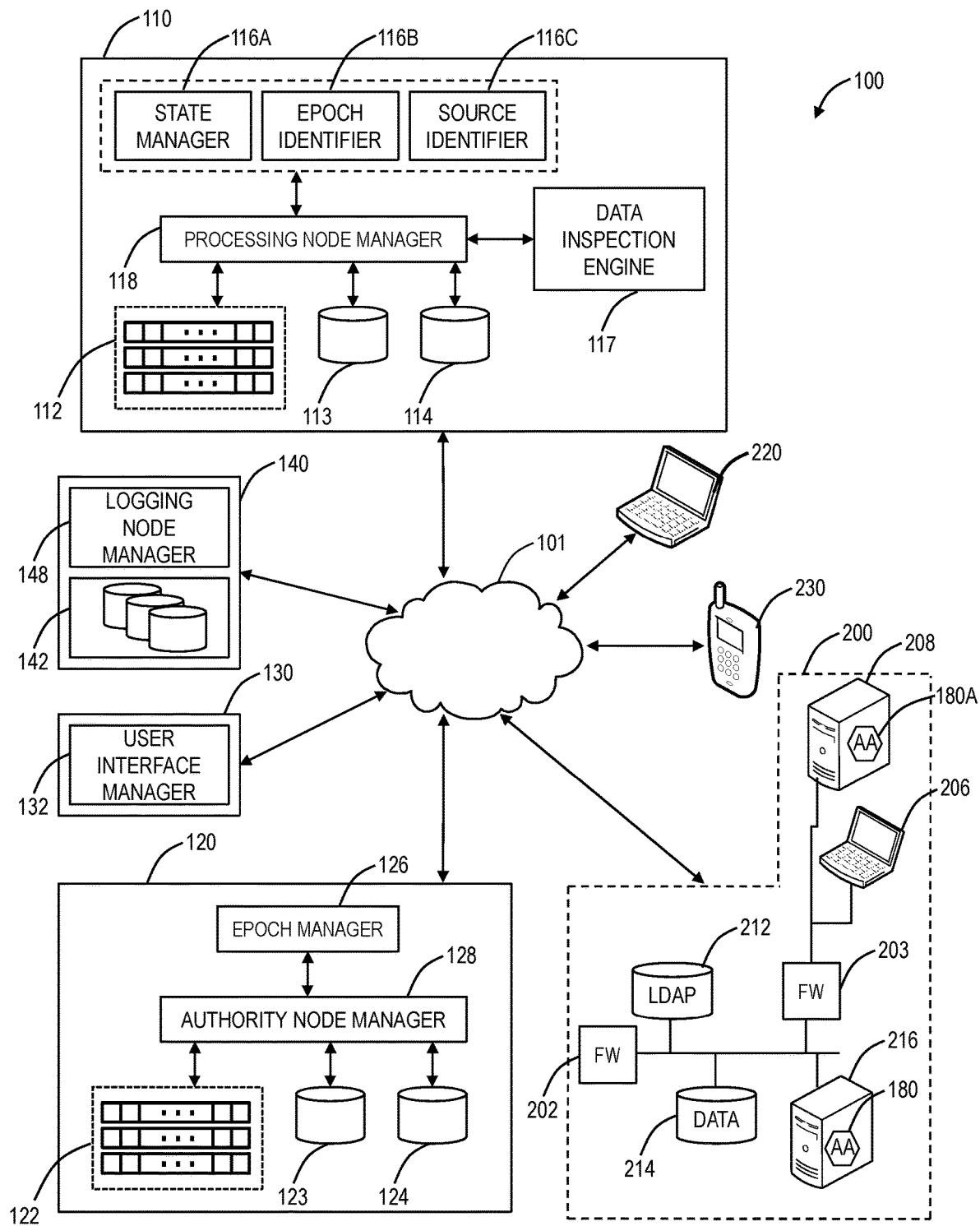
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§ 2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
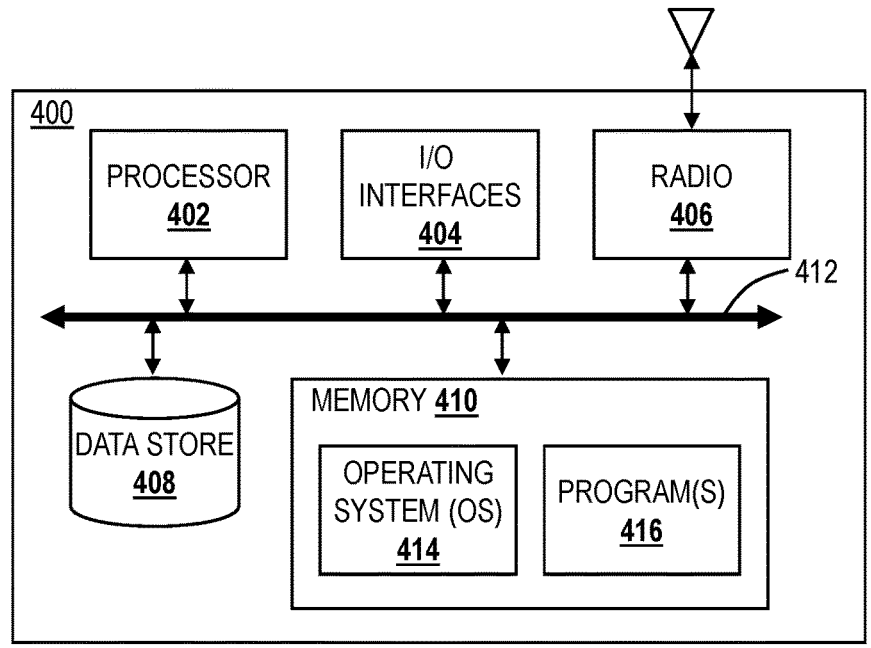
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
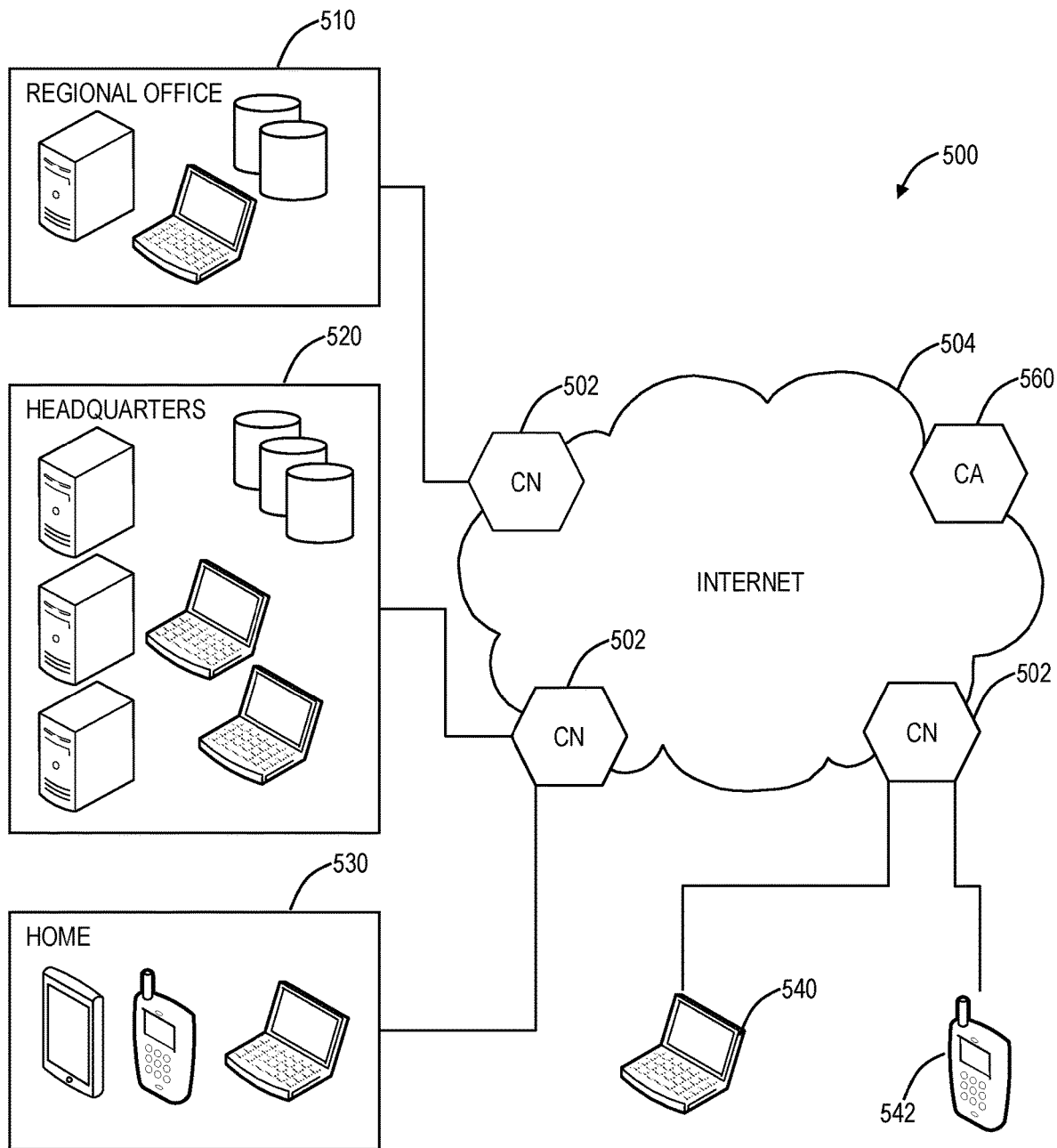
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud0based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
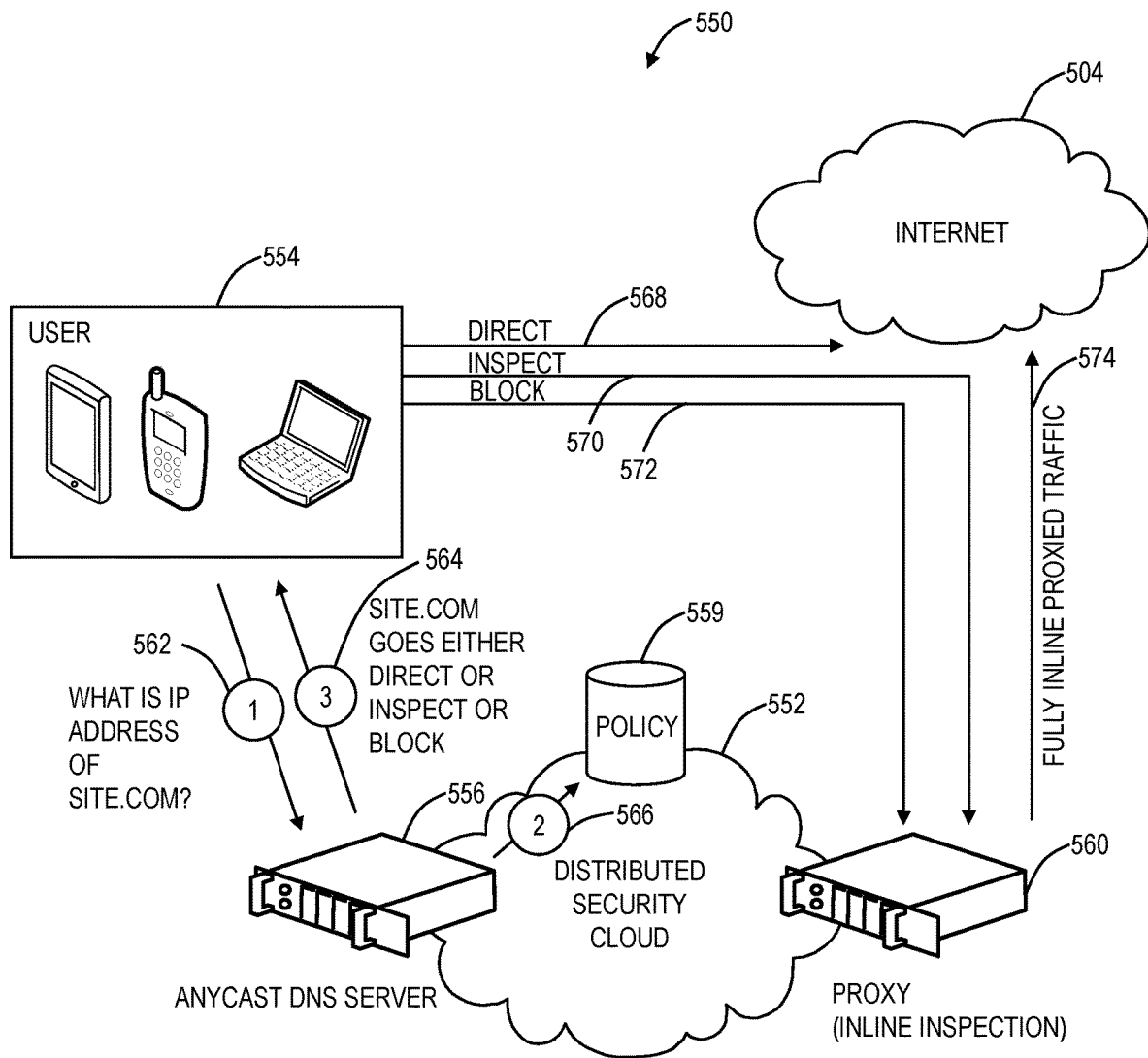
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully inline proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 CDN Architecture

Figure 7:
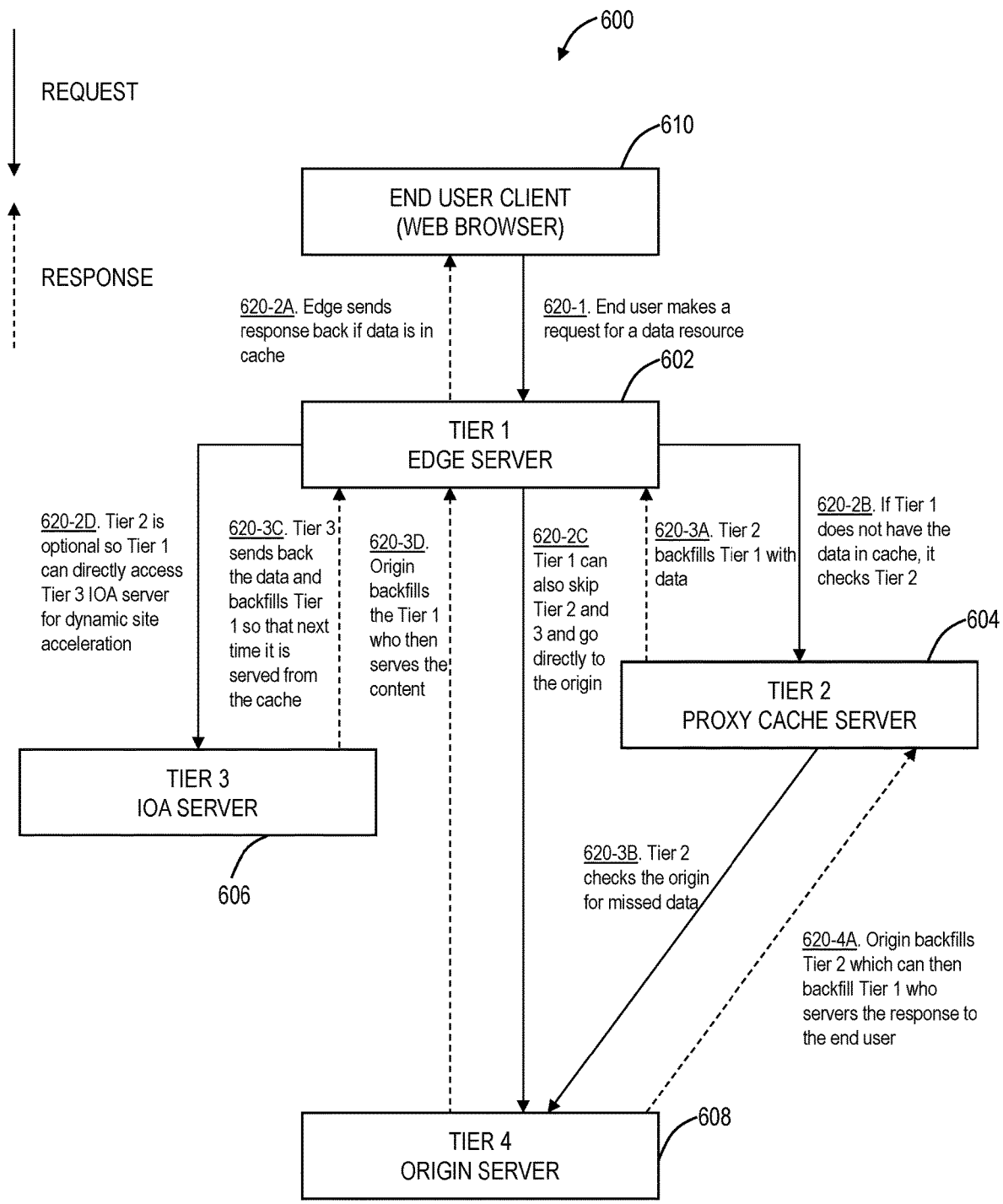
FIG. 7 is a network diagram of an exemplary CDN network in a multi-tiered architecture.

Referring to FIG. 7, in an exemplary embodiment, a network diagram illustrates an exemplary CDN network 600 in a multi-tiered architecture. The CDN network 600 includes edge servers 602, proxy cache servers 604, acceleration servers (IOA) 606, and origin servers 608. Of course, other multi-tiered architectures are contemplated, and a practical embodiment of the CDN network 600 may include multiple servers 602, 604, 606, 608. FIG. 7 illustrates exemplary functionality in the CDN network 600. Collectively, the multiple servers 602, 604, 606, 608 are content servers in a multi-tiered architecture. The edge server 602 are at Tier 1 and are responsible for delivering content to a requesting end user client 610 (such as web browser, mobile app, etc.) and are distributed across the globe. The edge servers 602 are connected to multiple Tier-2 and/or Tier-3 servers 604, 606 that fetch this content from the customer's origin servers 608. The origin servers 608 are typically hosted in a customer's demilitarized zone (DMZ) or in public cloud services such as Amazon, Azure, etc.

FIG. 7 illustrate exemplary operations through requests and responses between the servers 602, 604, 606, 608 and the end user client 610. The CDN servers 602, 604, 606 fetch content from the origin servers 608 by using either a content 'Push' or 'Pull' methodology. When content is sent via 'Push' method, the origin servers 608 pushes content to a storage server within CDN network. The origin servers 608 can push content 'On-demand' to the CDN network 600 when propagating content with 'Push' method. In the 'Pull' method, CDN servers 602, 604, 606 regularly poll the content servers and download updated content when available. There is no need to store content on a storage server in CDN network beforehand.

In an exemplary operation, the end user client 610 makes a request of the CDN network 600 for a data resource to the edge server 602 (step 620-1). The edge server 602 can send a response back if the data is in the cache (step 620-2A). If the edge server 602 does not have the data in the cache, the edge server 602 can check Tier 2 in the proxy cache server 604 (step 620-2B). The edge server 602 can also skip Tier 2 and 3 and go directly to the origin server 608 (step 620-2C). The edge server 602 can also directly access a Tier 3 acceleration server 606 for dynamic site acceleration (step 620-2D). If the edge server 602 checked the proxy cache server 604 (step 620-2B), the proxy cache server 603 can backfill the edge server 602 with the data (step 620-3A) or check the origin server 608 for missing data (step 620-3B). If the edge server 602 checked the acceleration server 606 (step 620-2D), the acceleration server 606 can send data and backfill the edge server 602 so that next time it is served from cache (step 620-3C). If the edge server 602 checked the origin server 608 directly (step 620-2C), the origin server 608 can backfill the edge server 602 who then serves the content (step 620-3D). Finally, if the proxy cache server 604 checked with the origin server 608 (step 620-3B), the origin server 608 backfills the proxy cache server 602 which can then backfill the edge server 602 who serves the response to the end user (step 620-4A).

§ 8.0 CDN with Distributed Security System Overlay

Figure 8:
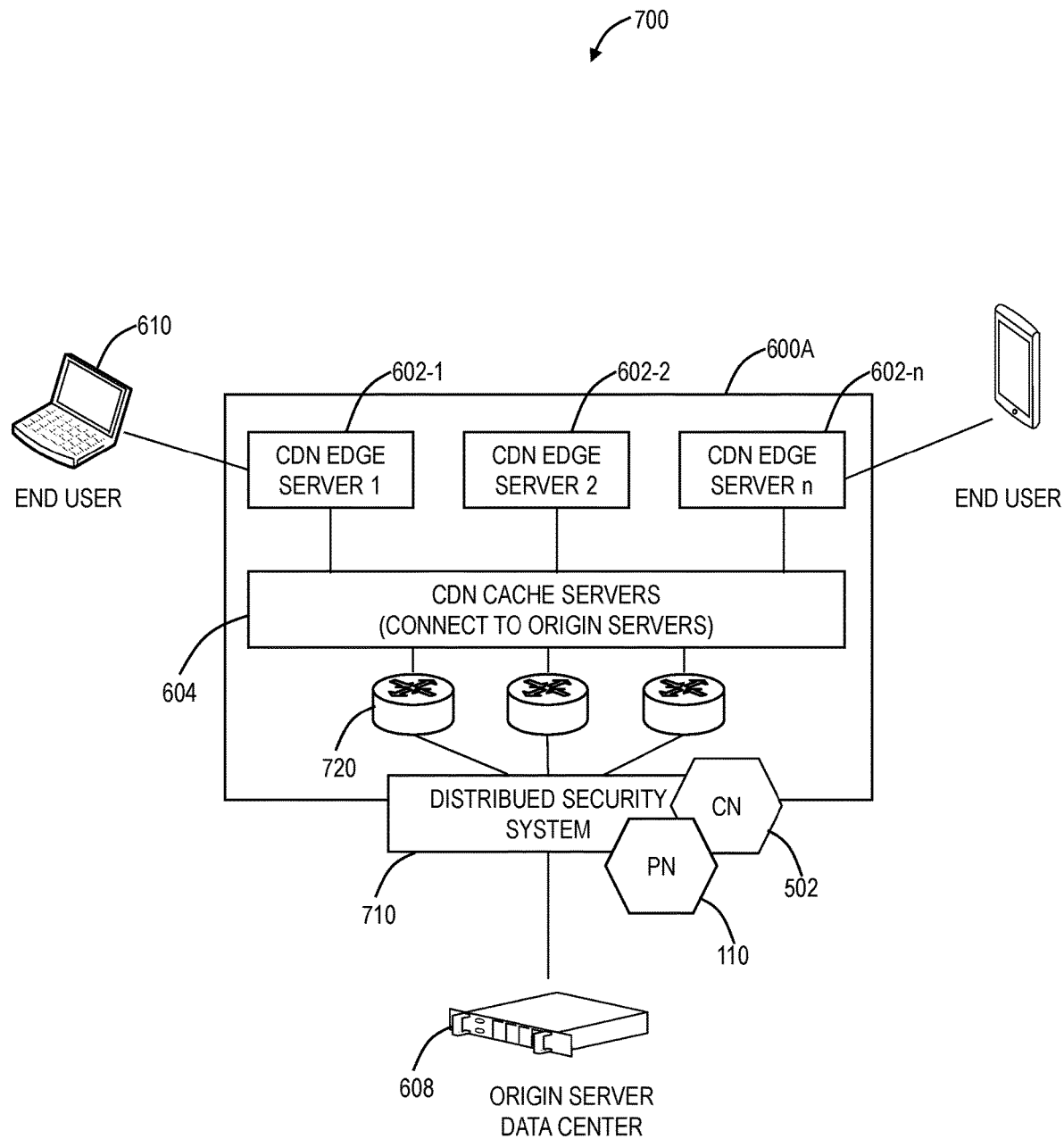
FIG. 8 is a network diagram of a network with the CDN network along with a distributed security system included therewith.
Figure 9:
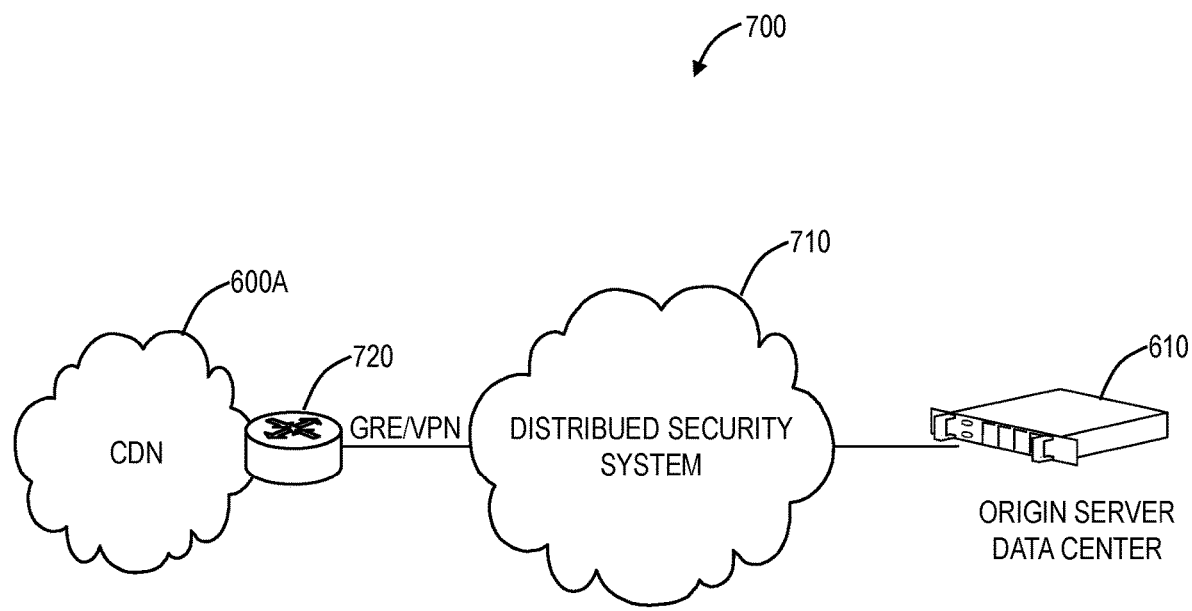
FIG. 9 is a network diagram of connectivity in the network of FIG. 8 between the CDN network, the distributed security system, and the origin server.

Referring to FIG. 8, in an exemplary embodiment, a network diagram illustrates a network 700 with the CDN network 600A along with the distributed security system 710 included therewith. Referring to FIG. 9, in an exemplary embodiment, a network diagram illustrates connectivity in the network 700 between the CDN network 600A, the distributed security system 710, and the origin server 608. The CDN network 600A includes edge servers 602-1, 602-2, . . . , 602-n communicatively coupled to the end users 610. The edge servers 602-1, 602-2, . . . , 602-n connect to the cache servers 604. The cache servers 604 connect to the origin servers 602 such as through routers/switches 720. In an exemplary embodiment, the distributed security system 710 can be the distributed security system 100 with one or more processing nodes 110 located between the cache servers 604 and the origin server 608. In another exemplary embodiment, the distributed security system 710 can be the cloud system 500 with one or more cloud nodes 502 located between the cache servers 604 and the origin server 608.

In various exemplary embodiments, the CDN network 600A is deployed such that the processing nodes 110 or the cloud nodes 502 are located at a perimeter so that all content pulled from the origin servers 602 or pushed to the CDN network 600A from the origin servers 602 is inspected by the distributed security system 710.

In an exemplary embodiment, such as in FIG. 9, Layer 2 (L2) forwarding such as through GRE or a VPN can be used for traffic forwarding from the routers/switches 720 to the distributed security system 710, namely the processing nodes 110 or the cloud nodes 502. All content pushed to the CDN network 600A or pulled from the CDN network 600A can be routed through the processing nodes 110 or the cloud nodes 502.

In an exemplary embodiment, the distributed security system 710 is dedicated to protecting the CDN network 600A. Here, there can be dedicated processing nodes 110 or cloud nodes 502, solely servicing the CDN network 600A. However, these private nodes 110, 502 can communicate as part of the distributed security system 100 or cloud system 500 to receive threat updates, i.e., zero-day/zero-hour, thereby providing the benefits of distributed protection. This dedicated configuration provides dedicated processing of content between the origin servers 608 and the CDN network 600A while receiving the benefits of threat updates from the authority nodes 120, based on the ongoing processing of other traffic. One key aspect of the distributed security system 100 and the cloud system 500 is the ability to detect and respond instantly to emerging threats.

In another exemplary embodiment, the distributed security system 710 is a multi-tenant system servicing multiple customers, such as in a public cloud. Here, public nodes 110, 502 could be deployed proximal to the origin server 608 or the CDN network 600A endpoint receiving the content. Alternatively, the CDN network 600A can be configured to pull content from the origin server 608 through the closest public nodes 110, 502 (inline proxy). This will ensure that even if the origin server 608 was hosting malware, the CDN network 600A will not have malicious objects replicated worldwide.

In a further exemplary embodiment, a hybrid deployment could be used where all traffic routed through the private nodes 110, 502, but a fallback could be configured to the public cloud. This will provide a fallback mechanism if the private nodes 110, 502 on-premise are not available for any reason.

In all of these exemplary embodiments, the distributed security system 710 is configured as an inline proxy system monitoring all traffic between the CDN network 600A and the origin server 608. As such, the distributed security system 710 can employ various monitoring techniques described herein, such as for malware, spyware, viruses, email spam, Data Leakage Prevention (DLP), content filtering, etc. Again, one advantage of the distributed security system 710 is the continuous monitoring of thousands or hundreds of thousands of users enables zero-day/zero-hour detection of malicious content, such as through sandboxing. An example of sandboxing in a cloud-based, distributed security system is described in commonly-assigned U.S. Pat. No. 9,152,789, issued on Oct. 6, 2015, and entitled "SYSTEMS AND METHODS FOR DYNAMIC CLOUD-BASED MALWARE BEHAVIOR ANALYSIS," the contents are incorporated by reference. This is an important function since malware intrusion into the CDN network 600A could rapidly spread worldwide. With continuous monitoring across a vast population, the distributed security system 710 is able to provide zero-day/zero-hour protection.

In another exemplary embodiment, the distributed security system 710 could be used for DLP or to ensure the CDN network 600A is not publishing confidential data by oversight. For example, intellectual property in the form of source code, customer account names, etc. as well as hacked pictures/videos, or the like. Here, the distributed security system 710 can be configured to monitor for specific data, such as via keywords, file signatures, etc. using various detection techniques. Once identified, the specific data can be blocked and prevented from distribution through the CDN network 600A.

Furthermore, the origin server 608 can be configured with a firewall that only accepts traffic from the distributed security cloud 710 to significantly mitigate the possibility of Distributed Denial of Service (DDoS) attacks against the origin server 608.

Typically, traffic patterns between the origin server 608 and the CDN network 600A can range between a maximum throughput of about 200 Mbps and a minimum throughput of about 25 Mbps. In an exemplary configuration here, the CDN network 600A can route CDN traffic through the distributed security system by using a GRE tunnel with PBR from the CDN router/switch/firewall 720. If GRE or a VPN tunnel is not possible, then a no-auth Protected Access Credential (PAC) file could be used on appropriate the CDN server (with CDN IPs provisioned as known location). Based on the origin server 608 location and the CDN caching server location 604, appropriate tunnel end points or PAC proxy IPs can be recommended.

The CDN network 600A can offer security as an add-on service for CDN customers and provide such service per customer, through the distributed security cloud 710. While evaluating CDN architecture, it is proposed that a true hybrid approach is required to prevent threats and the distributed security system 710's cloud delivered security architecture is best suited for such complex, distributed architecture. It gives flexibility to a CDN provider to start with a public cloud with an option to deploy a private cloud as CDN traffic volume increases. The solution is also flexible to accommodate all CDN traffic irrespective of CDN's customer or provide an option to CDN provider to offer this as value added service to its customers.

§ 9.0 Content Delivery Network (CDN) Protection Method

Figure 10:
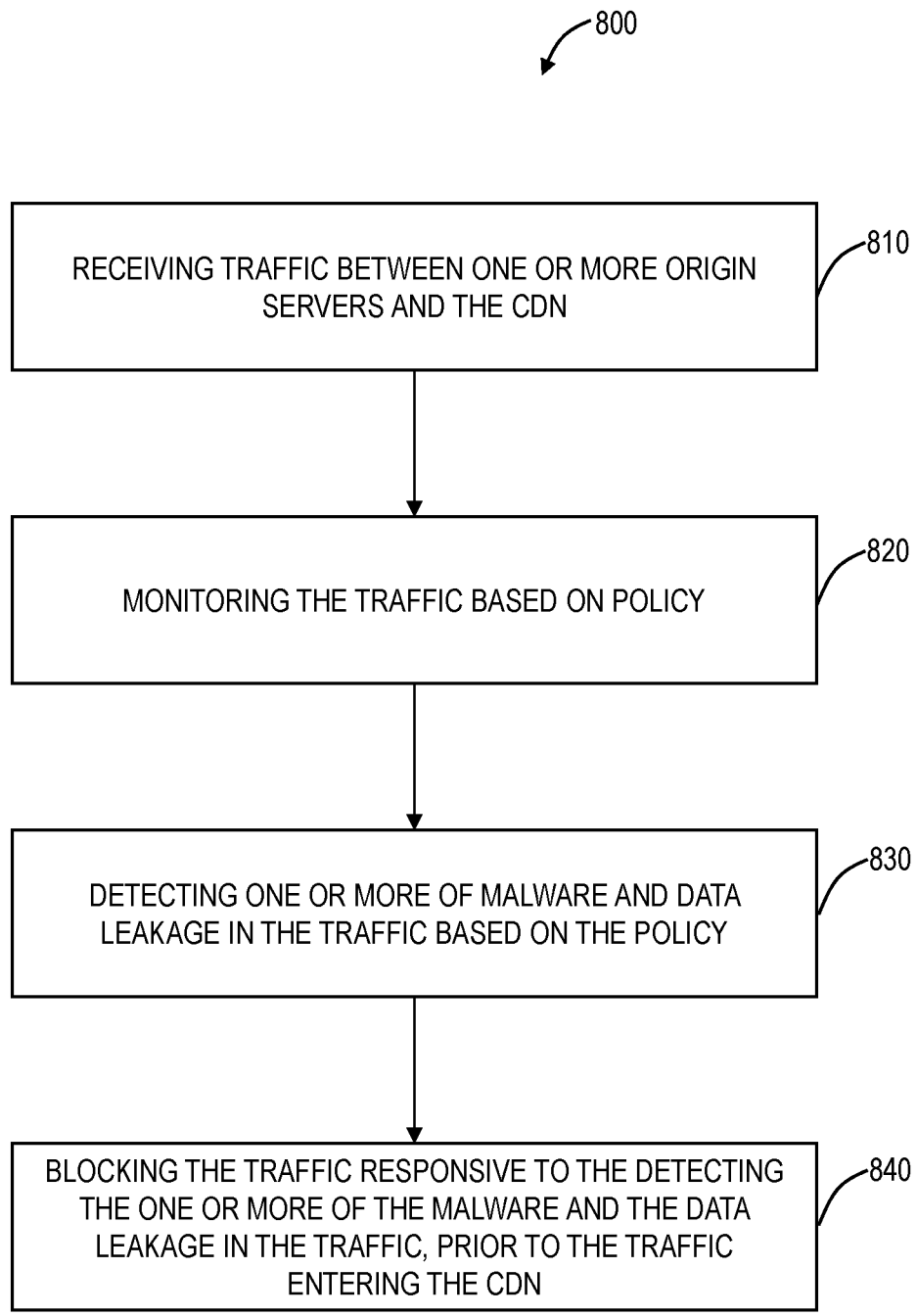
FIG. 10 is a flowchart of a Content Delivery Network (CDN) protection method, performed by a cloud node in a distributed security system.

Referring to FIG. 10, in an exemplary embodiment, a flowchart illustrates a Content Delivery Network (CDN) protection method 800, performed by a cloud node in a distributed security system. The CDN protection method 800 includes receiving traffic between one or more origin servers and the CDN (step 810); monitoring the traffic based on policy (step 820); detecting one or more of malware and data leakage in the traffic based on the policy (830); and blocking the traffic responsive to the detecting the one or more of the malware and the data leakage in the traffic, prior to the traffic entering the CDN (840).

In an exemplary embodiment, the cloud node is deployed at a perimeter of the CDN in a dedicated configuration, wherein the dedicated configuration includes the cloud node solely receiving the traffic between the one or more origin servers and the CDN and participating in updates based on monitoring of other users in the distributed security system. In another exemplary embodiment, the cloud node is deployed proximal to one of the one or more origin servers and the CDN in a public configuration, wherein the public configuration includes the cloud node receiving the traffic between the one or more origin servers and the CDN as well as for other users and participating in updates based on monitoring of the other users in the distributed security system. In a further exemplary embodiment, the cloud node is deployed proximal to one of the one or more origin servers and the CDN in a hybrid configuration, wherein the hybrid configuration includes the cloud node solely receiving the traffic between the one or more origin servers and the CDN as well as for other users and participating in updates based on monitoring of the other users in the distributed security system and a fallback configuration where the distributed security system takes over the receiving, the monitoring, the detecting, and the blocking responsive to a failure of the cloud node.

The receiving can be via one of generic routing encapsulation (GRE) and a virtual private network (VPN) between the CDN and the distributed security system. The origin server can be configured to only accept traffic from the cloud node, to mitigate Distributed Denial of Service (DDoS) attacks on the origin server. The origin server can be configured to provide the traffic to the CDN via one or more of a push technique and a pull technique. The data leakage can be detected by providing the cloud node associated data to monitor; wherein the associated data includes any of source code, customer account names, and content files. The malware can be detected using zero-day/zero-hour detection via sandboxing through the distributed security system.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Content Delivery Network (CDN), the CDN comprising:
one or more cache servers communicatively coupled to end users, via one or more edge servers, for providing content thereto; and one or more origin servers communicatively coupled to the one or more cache servers through a plurality of nodes, the plurality of nodes being located in a separate network, remote from the cache servers, the one or more cache servers are configured to
receive traffic related to the content from the one or more origin servers through the one or more nodes of the plurality of nodes, based on one or more of a push technique and a pull technique, and the plurality of nodes are configured to
monitor the traffic between the one or more origin servers and the one or more cache servers in an inline manner,
process the traffic such that all traffic within the CDN received from the one or more origin servers by the plurality of nodes for the one or more cache servers and all traffic received from the one or more cache servers by the plurality of nodes for the one or more origin servers is inspected for malware and data leakage by one of the plurality of nodes based on policy, and
block the traffic within the CDN at the one of the plurality of nodes responsive to detection of one or more of the malware and the data leakage, such that the blocked traffic from the one or more origin servers is blocked by the one of the plurality of nodes prior to reaching the one or more cache servers and the blocked traffic from the one or more cache servers is blocked by the one of the plurality of nodes prior to reaching the one or more origin servers.

2. The CDN of claim 1, wherein the one or more origin servers have a firewall configured to only accept the traffic from the plurality of nodes.

3. The CDN of claim 1, wherein the plurality of nodes are deployed at a perimeter of the CDN in a dedicated configuration where the plurality of nodes receive the traffic between the one or more origin servers and the one or more cache servers.

4. The CDN of claim 3, wherein the plurality of nodes are part of a larger distributed security system, and wherein the plurality of nodes receive and provide updates with the larger distributed security system.

5. The CDN of claim 1, wherein the plurality of nodes are deployed in a public configuration where the plurality of nodes receive the traffic between the one or more origin servers and the one or more cache servers as well as for other users not associated with the CDN network.

6. The CDN of claim 1, wherein the receiving is via one of generic routing encapsulation (GRE) and a virtual private network (VPN) between the one or more cache servers and the plurality of nodes.

7. The CDN of claim 1, wherein the data leakage is detected by providing the plurality of nodes associated data to monitor, wherein the associated data includes any of source code, customer account names, and content files.

8. The CDN of claim 1, wherein the malware is detected using zero-day/zero-hour detection via sandboxing through a distributed security system associated with the plurality of nodes.

9. A node in a cloud system that protects a Content Delivery Network (CDN), the node comprising:
a network interface, a data store, and a processor communicatively coupled to one another, wherein the network interface is communicatively coupled to one or more origin servers in the CDN and to one or more cache servers communicatively coupled to end users, via one or more edge servers, for providing content thereto, the node being located in a separate network, remote from the cache servers; and memory storing computer executable instructions, and in response to execution by the processor, the computer-executable instructions cause the processor to
receive traffic from the one or more cache servers destined for the one or more origin servers and traffic from the one or more origin servers destined for the one or more cache servers,
monitor the traffic in an inline manner,
process the traffic such that all traffic within the CDN received from the one or more origin servers by the node for the one or more cache servers and all traffic received from the one or more cache servers by the node for the one or more origin servers is inspected for malware and data leakage by the node based on policy, and
block the traffic within the CDN responsive to detection of one or more of the malware and the data leakage, such that the blocked traffic from the one or more origin servers is blocked by the node prior to reaching the one or more cache servers and the blocked traffic from the one or more cache servers is blocked by the node prior to reaching the one or more origin servers.

10. The node of claim 9, wherein the one or more origin servers have a firewall configured to only accept the traffic from the node.

11. The node of claim 9, wherein the node is deployed at a perimeter of the CDN in a dedicated configuration where the node receives the traffic between the one or more origin servers and the one or more cache servers.

12. The node of claim 11, wherein the node is part of a larger distributed security system, and wherein the node receives and provides updates with the larger distributed security system.

13. The node of claim 9, wherein the node is deployed in a public configuration where the node receives the traffic between the one or more origin servers and the one or more cache servers as well as for other users not associated with the CDN network.

14. The node of claim 9, wherein the traffic is received via one of generic routing encapsulation (GRE) and a virtual private network (VPN) between the one or more cache servers and the node.

15. The node of claim 9, wherein the data leakage is detected by providing the node associated data to monitor, wherein the associated data includes any of source code, customer account names, and content files.

16. The node of claim 9, wherein the malware is detected using zero-day/zero-hour detection via sandboxing through a distributed security system associated with the node.

17. A method comprising:
in a node in a cloud system that protects a Content Delivery Network (CDN), the node comprising a network interface, a data store, and a processor communicatively coupled to one another, wherein the network interface is communicatively coupled to one or more origin servers in the CDN and to one or more cache servers communicatively coupled to end users, via one or more edge servers, for providing content thereto, receiving traffic from the one or more cache servers destined for the one or more origin servers, the node being located in a separate network, remote from the cache servers,
monitoring the traffic in an inline manner, processing the traffic such that all traffic received within the CDN from the one or more origin servers by the node for the one or more cache servers and all traffic received from the one or more cache servers by the node for the one or more origin servers is inspected for malware and data leakage by the node based on policy, and blocking the traffic responsive to detection of one or more of the malware and the data leakage at the node, such that the blocked traffic from the one or more origin servers is blocked by the node prior to reaching the one or more cache servers and the blocked traffic from the one or more cache servers is blocked by the node prior to reaching the one or more origin servers.

18. The method of claim 17, wherein the one or more origin servers have a firewall configured to only accept the traffic from the node.

19. The method of claim 17, wherein the node is deployed at a perimeter of the CDN in a dedicated configuration where the node receives the traffic between the one or more origin servers and the one or more cache servers.

20. The method of claim 17, wherein the node is deployed in a public configuration where the node receives the traffic between the one or more origin servers and the one or more cache servers as well as for other users not associated with the CDN network.

\* \* \* \* \*